(12) United States Patent
van Puijenbroek et al.

(10) Patent No.: US 9,019,159 B2
(45) Date of Patent: Apr. 28, 2015

(54) RANGING DIVERSITY-RECEPTION METHOD AND RECEIVER

(75) Inventors: Cornelis Adrianus Henricus Maria van Puijenbroek, Leusden (NL); Rainer Hach, Berlin (DE)

(73) Assignee: Nanotron Technologies, Ltd., London, England (GB)

( * ) Notice: Subject to any disclaimer, the term of this patent is extended or adjusted under 35 U.S.C. 154(b) by 811 days.

(21) Appl. No.: 12/998,902

(22) PCT Filed: Dec. 15, 2009

(86) PCT No.: PCT/EP2009/067195
§ 371 (c)(1),
(2), (4) Date: Jun. 13, 2011

(87) PCT Pub. No.: WO2010/069959
PCT Pub. Date: Jun. 24, 2010

(65) Prior Publication Data
US 2011/0267234 A1      Nov. 3, 2011

(30) Foreign Application Priority Data

Dec. 16, 2008   (EP) ..................... 08171866

(51) Int. Cl.
*G01S 1/24*      (2006.01)
*G01S 5/04*      (2006.01)
*G01S 5/02*      (2010.01)
*H04W 64/00*     (2009.01)

(52) U.S. Cl.
CPC ............. *G01S 5/0215* (2013.01); *H04W 64/00* (2013.01)

(58) Field of Classification Search
USPC ............ 342/387, 442, 463, 465; 340/539.13, 340/539.16
See application file for complete search history.

(56) References Cited

U.S. PATENT DOCUMENTS 5,365,516 A * 11/1994 Jandrell ..................... 370/335
2008/0036599 A1   2/2008 Richards et al. ............ 340/568.1

FOREIGN PATENT DOCUMENTS

EP           1253437        10/2002
WO    WO 03/044968          5/2003

OTHER PUBLICATIONS

IEEE, 0-7803-8187-4/03; Chung, Woo Cheol et al.; "An Accurate Ultra Wideband (UWB) Ranging for Precision Asset Location"; pp. 389-393; Nov. 16, 2003.
European Patent Office; Rabe, M.; "International Search Report"; whole document; Jan. 19, 2010.

* cited by examiner

*Primary Examiner* — Dao Phan
(74) *Attorney, Agent, or Firm* — Ware, Fressola, Maguire & Barber LLP (57) ABSTRACT

Method for determining an arrival time of a RF ranging signal at a ranging receiver, comprising receiving at least one RF ranging signal via a plurality of antennas comprised by the ranging receiver, providing a plurality of antenna signals, each comprising at least a section of the ranging signal as received either by a respective one of the antennas or by a linear combination of at least two of the antennas, determining respective candidate arrival times of the at least one ranging signal from at least two of the antenna signals and determining the arrival time of the at least one ranging signal as the earliest candidate arrival time.

16 Claims, 5 Drawing Sheets

RANGING DIVERSITY-RECEPTION METHOD AND RECEIVER

CROSS REFERENCE TO RELATED APPLICATIONS

This application is the U.S. National Stage of International Application No. PCT/EP2009/067195 filed on Dec. 15, 2009 which was published in English on Jun. 24, 2010 under International Publication Number WO 2010/069959.

BACKGROUND OF THE INVENTION

1. Technical Field

The present invention is in the field of RF ranging and locating. It describes a method to determine the time of arrival of a ranging signal.

2. Discussion of Related Art

Systems for estimating the location of a device (locating systems) or the distance between two devices (ranging systems) based on the transmission and reception of electromagnetic waves are commonly used.

Many of such locating systems rely on the estimation of the time difference of arrival (TDOA) of a signal at different receivers or of different signals at one receiver. Many of such ranging systems rely on the estimation of the time of flight (TOF) of the signal between a transmitter and a receiver. The estimation of TDOA as well as the estimation of TOF rely on the estimation of the absolute or relative time of arrival (TOA) of a signal.

A common problem in receivers, which perform such timing estimation is that not only the direct wave is received but also reflected waves.

For a TOA measurement, only the direct wave is relevant, the other waves are interference. As a result of the channel impulse response, an overlap of the direct wave and the reflected waves is observed at the receiving antenna. The TOA measurement then gets an error.

By doing repetitive measurements, one can average out certain errors. However, because the propagation environment may change very slowly or can even be quasi-static, this does not necessarily work in order to eliminate errors caused by multipath reflections.

DISCLOSURE OF INVENTION

According to a first aspect of the present invention, a method for determining an arrival time of a RF ranging signal is provided. The method comprises:
  receiving at least one RF ranging signal via a plurality of antennas comprised by the ranging receiver;
  providing a plurality of antenna signals, each comprising at least a section of the ranging signal as received either by a respective one of the antennas or by a linear combination of at least two of the antennas;
  determining respective candidate arrival times of the at least one ranging signal from at least two of the antenna signals;
  determining the arrival time of the at least one ranging signal as the earliest candidate arrival time.

The method of the first aspect of the invention is based on the usage of an antenna diversity technique for a determination of an arrival time of the ranging signal. The method is applicable in any ranging systems and locating systems, which explicitly or implicitly rely on TOA estimation.

The method is based on the recognition that any error, which is introduced by multipath reflections, is always positive, i.e., leads to a determination of a later arrival time than the arrival time associated with a direct-path between the transmitter and the receiver of the ranging signal. The arrival time associated with the direct propagation path of the ranging signal between the transmitter and the receiver is the most suitable for ranging and locating applications. This fact is utilized as a criterion in the method of the present invention for picking the TOA estimate with the smallest error from a set of candidate TOA estimates which have been collected over different paths between the transmitter and the receiver node or for combining different antenna signals to obtain better estimates of the direct-path arrival time.

In the following, embodiments of the method of the invention will be described. The additional features of these embodiments may be combined with each other to form further embodiments, unless such features of different embodiments are disclosed as mutually excluding each other.

The use of an antenna diversity reception technique can be further exploited to increase the performance of the arrival-time determination. One embodiment of the method of the present invention comprises deriving at least one combined antenna signal as a linear combination of at least two different antenna signals from the plurality of antenna signals.

Different uses may be made of such linear combination(s) in the determination of an arrival time. Firstly, by determining respective candidate arrival times of the ranging signal not only for at least one of the antenna signals but also for at least one of the combined antenna signals, the number of useful candidate arrival times is increased. A linear combination of different antenna signals of an antenna array often allows retrieving the direct-wave signal with an improved signal-to-noise ratio and thus helps to determine its arrival time with better accuracy than with any single one of the antenna signals. Accordingly, in one embodiment, selecting the antenna signal is performed by selecting from at least one antenna signal or at least one combined antenna signal, whichever signal is associated with the earliest candidate arrival time. Secondly, in other embodiments, certain linear combinations of antenna signals from the antenna array are determined and selected to enhance and thus focus on the arrival-time estimation from a signal component received under a certain angle (range) of incidence with respect to the antenna array.

In this and other application contexts, in particular in the field of position determination, it is preferred to communicate the determined arrival time to an external node, which may contain a location engine, or to another ranging node.

In another embodiment, the method further comprises a time-difference calculation using an arrival time determined by an external ranging node. Thus, the following steps are performed:
  receiving at least one further arrival time of the same ranging signal from at least one external ranging node;
  determining a time difference between the at least one further arrival time and the arrival time determined locally at the receiver.

On the basis of the low-error determination of the ranging-signal arrival time, several other parameters useful in ranging and locating may be determined with improved correctness. In one embodiment, the method of further comprises
  ascertaining a transmission time of the ranging signal; and
  determining a time of flight of the ranging signal as the difference of the determined arrival time and the transmission time. The transmission time may be communicated as a part of the ranging signal or as a separate signal.

In another embodiment, the plurality of antennas are arranged to selectively receive different polarization components of the electromagnetic field of the ranging signal. This way, the probability is increased that not all of the antenna signals are equally affected by the same multipath reflection effects. Some materials may not reflect a certain polarization component, Others may change the polarization properties of the respective reflected ranging signal in comparison with the original ranging signal.

More than one ranging signal may be received in the framework of a ranging or locating method. For instance, a sequence of two or more individual (identical or non-identical) ranging signals may be transmitted by one ranging node to another ranging node. In such applications, which may for instance serve to determine a time of flight (TOF) of ranging signals between two or more ranging nodes in a ranging or locating system, it is particularly useful if the sequence of at least two ranging signals is received and processed by the ranging receiver in a way that for different ranging signals of the sequence different antennas or combinations or antennas are used in determining respective candidate arrival times.

Adaptive algorithms may be used determine or select the most suitable antenna signal(s) or linear combination(s) of antenna signals. In one embodiment, the selection of a particular linear combination of antenna signals is based on a motion prediction regarding the relative motion of the ranging node transmitting the ranging signal with respect to one or more other ranging nodes of a ranging or locating system. The antenna array is thus dynamically switched during operation to follow a changing direct transmission path between the ranging node transmitting the ranging signal and the receiving ranging node caused by relative motion of the nodes with respect to each other. Such motion prediction may use position or distance information, velocity information and/or acceleration information regarding this relative motion prior to the current moment in time.

For determining the arrival time for the candidates, known methods for time estimation may be employed. In one embodiment, determining candidate arrival times comprises detecting a leading edge of a signal feature in the at least one of the antenna signals. In addition or as an alternative, correlation peak detection and or super resolution algorithms may be employed.

An RF ranging receiver, which is configured to perform the method of the first aspect of the invention or one of its embodiments disclosed herein, forms a second aspect of the invention.

According to an embodiment of the ranging receiver of the second aspect of the invention, the ranging receiver is configured to
  receive a ranging signal via a plurality of antennas;
  internally provide an at least corresponding plurality of antenna signals, each comprising at least a section of the ranging signal as received either by a respective one of the antennas or by a linear combination of at least two of the antennas;
  determine respective candidate arrival times of the ranging signal from at least two of the antenna signals;
  determine the arrival time of the ranging signal as the earliest candidate arrival time.

The ranging receiver of the second aspect of the invention shares the advantages of the method of the first aspect of the invention.

In the following, further embodiments of the ranging receiver will be described. Again, additional features of different embodiments may be combined with each other to form further embodiments of the ranging receiver.

In one embodiment, the plurality of antennas forms an antenna array for receiving the ranging signal, and a controllable array switch, which is connected with the antenna array and which is configured to provide at its output at least one antenna output signal. The antenna output signal is either a selected one of the antenna signals or a predetermined linear combination of antenna signals, in accordance with control signals provided to the array switch.

The control of the array switch is preferably provided by further a timing processing unit, which is configured to generate and provide the control signals determining the linear combination of antenna signals or the selection of the antenna signals to be used for determining candidate arrival times of the ranging signal. Suitably, the timing processing unit is further configured to determine the candidate arrival times and the arrival time of the ranging signal.

Thus, the error which is introduced by multipath reflections is always positive. This fact is utilized as a criterion for picking the TOA estimate with the smallest error out of a set of candidate TOA estimates which have been collected over different paths between the transmitter and the receiver node or for combining such estimates.

For processing the RF signals, the ranging receiver comprises in one embodiment a RF receiver unit. The RF receiver unit is arranged downstream from the array switch and performs tasks, which are associated with retrieving the original ranging signal(s) from the RF antenna signals and which are known per se.

The RF ranging receiver is in one embodiment integrated into a RF ranging transceiver, comprising a ranging transmitter, which is configured to generate and transmit a RF ranging signal to an external RF ranging receiver, and the RF ranging receiver according to one of its embodiments disclosed herein.

In the RF ranging transceiver, the ranging transmitter is in one embodiment configured to transmit the ranging signal via an antenna array that is switched to form an array setup, which has been determined by the internal ranging receiver as allowing a detection of the earliest candidate arrival time in communication with the given external RF ranging receiver. This way, it is achieved that the antenna setup for the transmitter is the one which has been determined optimal in the receive case and that, given that the transmission channel is reciprocal, an addressed remote ranging receiver will therefore measure a TOA with a low error even if it does not use antenna diversity on its side.

A first application case of the invention is formed by a RF ranging system, which comprises at least one first ranging node for generating and transmitting a RF ranging signal, and at least one second ranging node, which either forms or comprises a RF ranging receiver according to the second aspect of the invention or one its embodiments disclosed herein. The first or the second ranging node of the RF ranging system is preferably configured to determine a distance between the first and second ranging nodes using the time of arrival of the ranging signal determined by the second ranging node.

A second application case of the invention is a RF locating system, which comprises at least one first ranging node for generating and transmitting a RF ranging signal, and at least two second ranging nodes, which either form or comprise a RF ranging receiver according to the second aspect of the invention or one of its embodiments. The first or at least one of the second ranging nodes is configured to determine a position of at least one of the second ranging nodes using the time of arrival of the ranging signal determined by the second ranging nodes. In one embodiment, three RF ranging receivers are provided in the RF locating system.

The invention may also be incorporated in a computer program product, which comprises software code for performing the steps of the method of the first aspect of the invention (or one of its embodiments), when loaded into an internal memory of a digital computer and executed on the computer.

DETAILED DESCRIPTION

Figure 1:
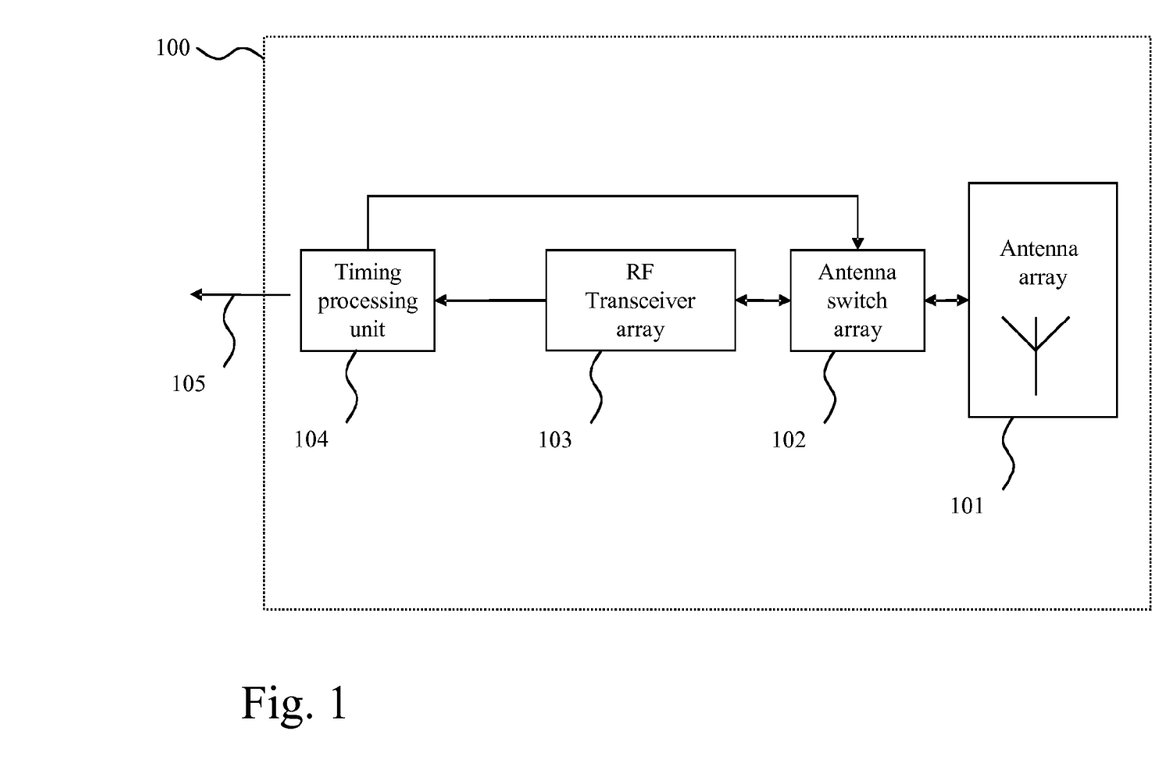
FIG. 1 shows a simplified block diagram of a ranging node comprising an embodiment of a ranging receiver.

FIG. 1 shows, by way of a simplified block diagram, a ranging node 100. The ranging node 100 basically is a node capable of measuring the TOA of a received signal.

It comprises an antenna array 101 which contains at least one RF antenna, but may contain a plurality of RF antennas. The antenna array 101 is connected with the inputs of an antenna switch array 102. The output of the antenna switch array 102 is connected with the input of an RF transceiver array 103 which contains at least one receiver but may contain a plurality of RF receivers and RF transmitters. The output of the RF transceiver array is connected with the input a timing processing unit 104 which is capable of estimating the TOA of the received signal.

For the range measurement, only the partial signal of the ranging signal, which is received via a direct path between the transmitter and the receiver of the ranging signal, is relevant, the other waves are interference. The reflection problem is that the summation of the direct and the reflected waves at the receiving antenna distorts the impulse response of the channel. However, since there cannot be an earlier signal than the direct wave, there is a probability that not all antennas have the reflection problem. This is supported in particular by using two or more antennas which are adequately decorrelated, e.g., by a difference in the combination of angle, location or polarisation, As a result, the receiver 100 can choose between several TOA measurements and select candidate, from which the signal(s) with the lowest arrival time value(s) is (are) the value with the highest probability of representing the direct-path TOA (selection diversity). Alternatively or in addition, the measurement results can be combined to filter out the reflected waves (combining diversity). As a result, the ranging decision is made after processing signals of several antennas, which implies that several impulse responses of the wireless link are taken into account via different antennas, which will often result in different candidate arrival times. The earliest candidate arrival time is selected as the arrival time of the ranging signal.

Figure 2:
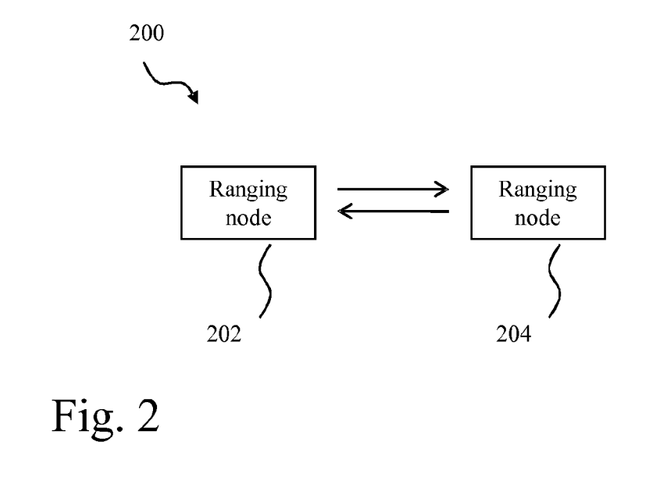
FIG. 2 shows a ranging system which contains two ranging nodes.

FIG. 2 shows a ranging system 200 which contains two ranging nodes 202 and 204. The ranging nodes 202 and 204 are of the type of ranging node 100 of FIG. 1. They additionally contain at least one transmitter and have the capability to measure the TOA of a received ranging signal relative to a point in time when the ranging signal has been transmitted by the respective other node in the past. Based on this information, a distance between the two nodes can be calculated, taking into account the known propagation speed of the RF ranging signal, which is the speed of light.

Figure 3:
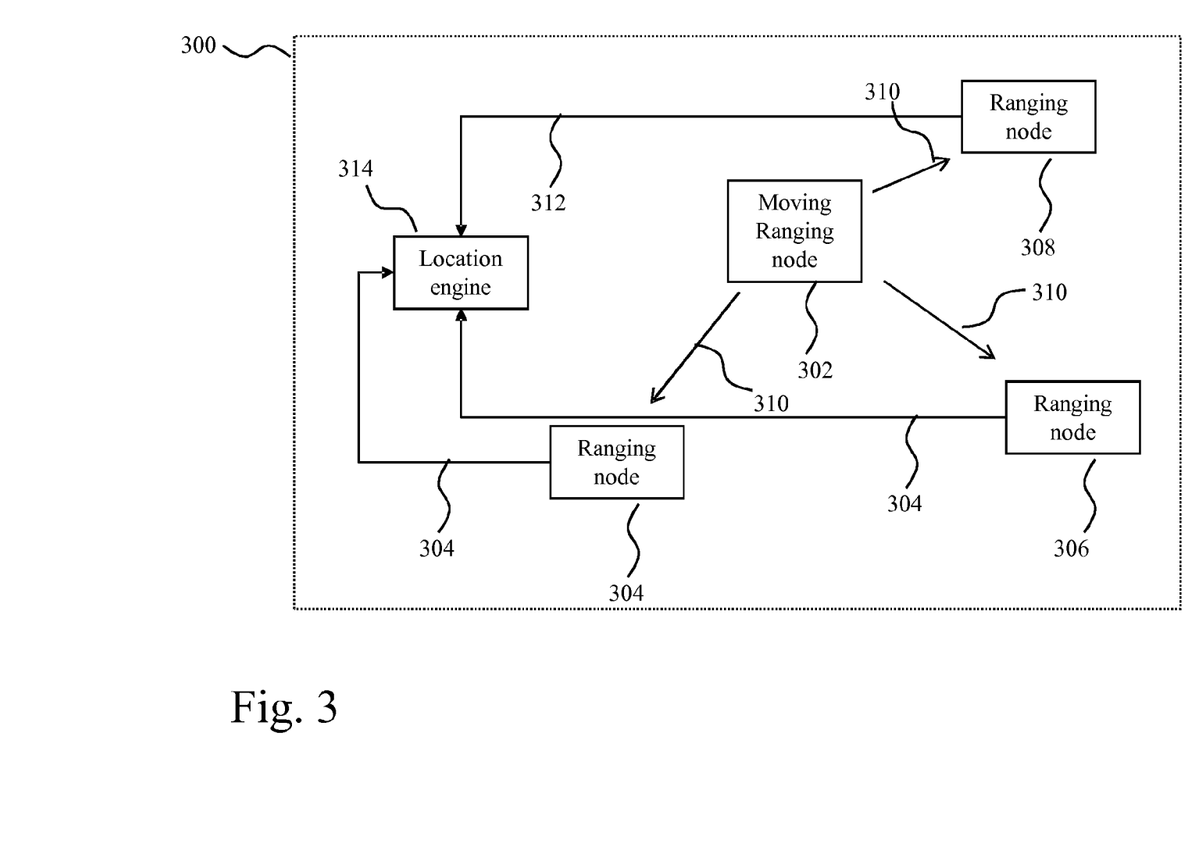
FIG. 3 shows a TDOA-based locating system which contains one moving ranging node and three fixed ranging nodes.

FIG. 3 shows a TDOA based locating system 300, which contains one moving ranging node 302 and three fixed ranging nodes 304, 306 and 308. The moving ranging node 302 periodically transmits a ranging signal 310, which is received by the fixed ranging nodes 304, 306 and 308. Due to potentially different distances between the moving ranging node 302 and the fixed ranging nodes 304 to 308, and the finite propagation time of the signal, the signal will be received at the fixed ranging nodes at different times of arrival. The different TOAs estimated by the fixed ranging nodes are communicated over some arbitrary (wireless or wired) information channel 312 to a location engine 314, which calculates the location of the moving ranging node 302 based on the information which it receives. As is well known, an unambiguous two-dimensional location calculation is possible only when using three fixed ranging nodes. For one dimensional location at least two fixed ranging nodes are required, while for three dimensional location at least four fixed ranging nodes are required However, an ambiguity of the location calculation remaining when using only two fixed nodes for two-dimensional location calculation or, generally speaking, one fixed node less than the required number for resolving the ambiguity, may be acceptable if the ambiguity can be resolved by additional information on the location. For instance, one of the two remaining possible locations may be known to be actually impossible to reach for the moving node. Under circumstances of this type, only two fixed ranging nodes may be sufficient to unambiguously determine the location of the moving node 302.

Figure 4:
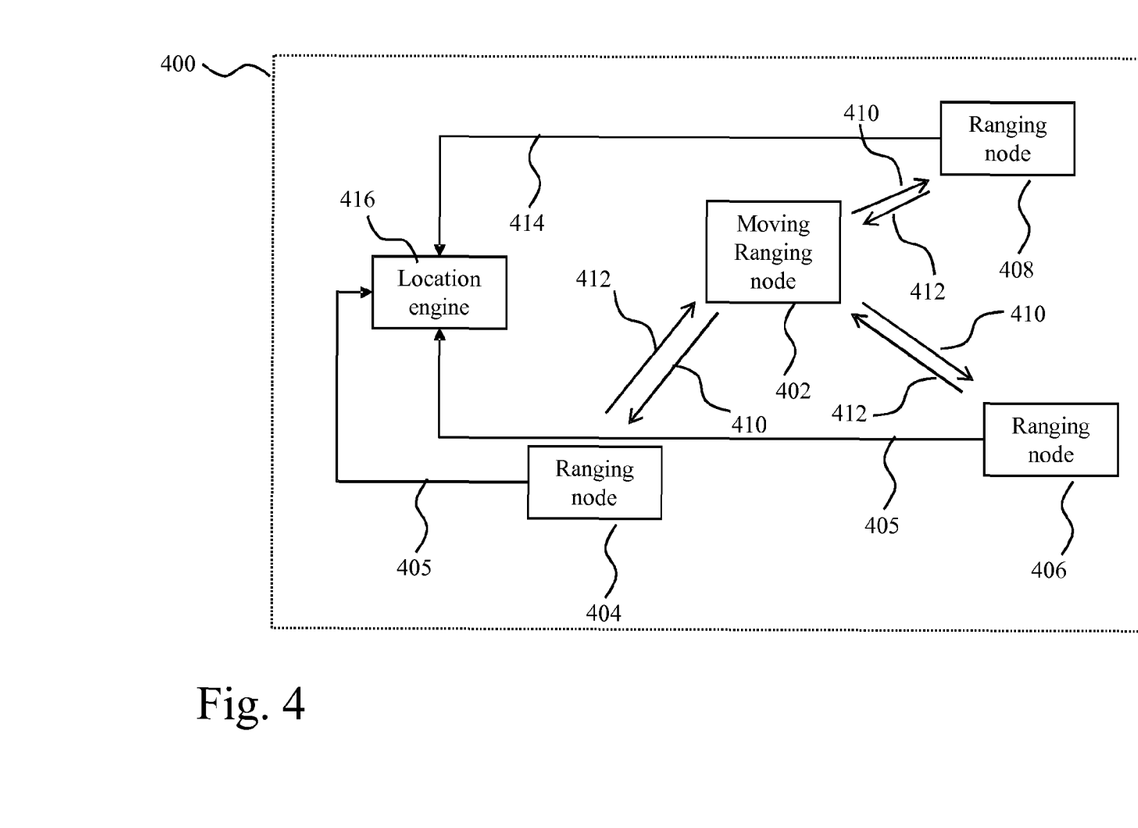
FIG. 4 shows a TOA-based locating system which contains one moving ranging node and three fixed ranging nodes.

FIG. 4 shows a TOA based locating system 400 which contains one moving ranging node 402 and three fixed ranging nodes 404, 406, and 408. The moving ranging node 402 periodically transmits a ranging signal 410 to each individual fixed ranging node and receives a respective ranging response signal 412 from each individual fixed ranging node 404, 406, 408. After this exchange of signals each fixed ranging node has an estimate of the TOF between itself and the moving ranging node. The TOF values from the individual fixed ranging nodes are communicated over some arbitrary (wired or wireless) information channel 414 to a location engine 416 which calculates the location of the moving ranging node based on the information which it receives.

In a preferred embodiment of the invention the estimation of TOA is repeated in a timely manner for different settings of the antenna switch array. Since different settings of the antenna switch array are likely to yield different TOA estimates, the earliest TOA is selected as the one with the smallest error. Furthermore from the distribution of the TOA estimates measure for the reliability of the estimate is derived. If for example all estimates fall within a tight range the estimate can be seen as more reliable as when the estimates show a big spread.

In another preferred embodiment of the invention the estimation of TOF is repeated in a timely manner for different settings of the antenna switch array. Since different settings of the antenna switch array are likely to yield different TOF estimates, the shortest TOF is selected as the one with the smallest error. Furthermore from the distribution of the TOA estimates measure for the reliability of the estimate is derived. If for example an estimate has a small variation fall the estimate can be regarded as to be more reliable than estimates with larger variations.

Figure 5:
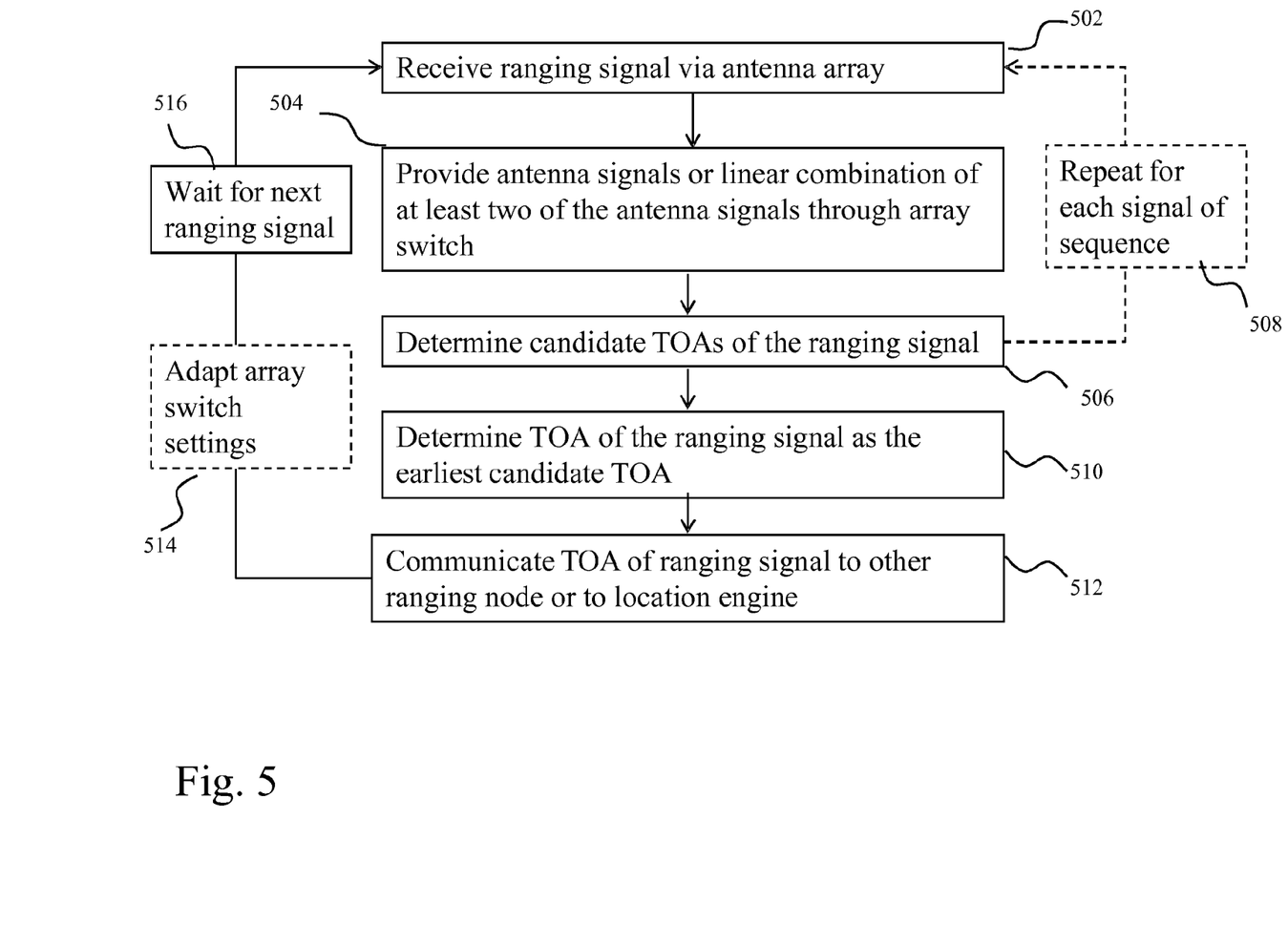
FIG. 5 shows a flow diagram of a method for determining an arrival time of a ranging signal at a ranging receiver.

FIG. 5 is a flow diagram of a method for determining a TOA of a ranging signal. The method may be performed by the ranging node 100 of FIG. 1, or the ranging nodes 202 and 204 of FIG. 2, or the ranging nodes 302 to 308 of the locating system 300 of FIG. 3, or the ranging nodes 402 to 408 of the locating system 400 of FIG. 4.

At a step 502, a ranging signal is received via an antenna array. A controllable array switch provides selected antenna signals or a linear combination of at least two of the antenna signals at step 504. A timing processing unit then determines candidate TOAs of the ranging signal at step 506. In case a sequence of ranging signals is provided by an external ranging node, the steps 502 to 506 are repeated for each ranging signal of the sequence, step 508. Providing a ranging signal sequence is an option, as indicated by dashed arrows and outlines. From all candidate TOAs determined, the TOA of the ranging signal is determined as the earliest candidate TOA. In the optional case of a ranging signal sequence, the TOA resulting in the shortest TDOA or TOF is selected. The TOA of the ranging signal may then be communicated to another ranging node or to a location engine, at step 512. However, in another embodiment, the TOA is not communicated to the outside. At any suitable time during the process, the array switch settings may be adapted to select another set of antenna signal and/or another linear combination for determining candidate TOAs. One suitable time is after the finished determination of a TOA of the last received ranging signal, as shown by step 514. The process then waits for the next ranging signal to be received (step 516), for which the process is started again at step 502.

In short summary, the present invention discloses the usage of diversity techniques for ranging systems and locating systems which explicitly or implicitly rely on TOA estimation.

It should be noted that the abbreviation "RF" is not to be interpreted in a restricted manner to comprise only frequencies of electromagnetic waves in the radio frequency range, but to refer generally to high-frequency electromagnetic signals. The invention can also be performed with electromagnetic waves having frequencies higher or lower than the frequency range commonly described as "radio frequency" or RF. In particular, frequencies in the THz regime or in the infrared or visible optical regime may be used in certain applications.

Furthermore, the invention is not limited to using particular ranging signals. A ranging signal may in some embodiments be particularly configured to allow a precise determination of its arrival time, as it is useful in ranging and locating applications. However, in other embodiments, any RF signal, which allows a determination of an arrival time of its signal features, may be used as the ranging signal.

The invention claimed is:

1. A method for determining an arrival time of a RF ranging signal at a ranging receiver, comprising:
   receiving at least one RF ranging signal via a plurality of antennas comprised by the ranging receiver;
   providing a plurality of antenna signals, each comprising at least a section of the ranging signal as received either by a respective one of the antennas or by a linear combination of at least two of the antennas;
   determining respective candidate arrival times of the at least one ranging signal from at least two of the antenna signals;
   determining the arrival time of the at least one ranging signal as an earliest one of the candidate arrival times.

2. The method of claim 1, further comprising
   communicating the determined arrival time to an external ranging node or location engine.

3. The method of claim 1, further comprising
   receiving at least one further arrival time of the same ranging signal from at least one external ranging node;
   determining a time difference between the at least one further arrival time and the arrival time determined locally.

4. The method of claim 1, further comprising
   ascertaining a transmission time of the ranging signal;
   determining a time of flight of the ranging signal as the difference of the determined arrival time and the transmission time.

5. The method of claim 1, wherein the plurality of antennas are arranged to selectively receive different polarization components of the ranging signal.

6. The method of claim 1, wherein a linear combination of antennas is used, which enhances a ranging signal component received through a predetermined angle of arrival.

7. The method of claim 1, wherein a sequence of at least two ranging signals is received, and wherein for different ranging signals of the sequence different antennas or combinations of antennas are used for determining respective candidate arrival times.

8. The method of claim 1, further comprising
   dynamically adapting a selection of antenna signals to be used for determining candidate arrival times.

9. A RF ranging receiver, which is configured to
   receive at least one ranging signal via a plurality of antennas;
   internally provide an at least corresponding plurality of antenna signals, each comprising at least a section of the at least one ranging signal as received either by a respective one of the antennas or by a linear combination of at least two of the antennas;
   determine respective candidate arrival times of the at least one ranging signal from at least two of the antenna signals;
   determine the arrival time of the at least one ranging signal as an earliest one of the candidate arrival times.

10. The RF ranging receiver of claim 9, wherein
    the plurality of antennas forms an antenna array for receiving the ranging signal;
    a controllable array switch is connected with the antenna array and configured to provide at its output at least one antenna output signal, which is either a selected one of the antenna signals or a predetermined linear combination of antenna signals, in accordance with control signals provided to the array switch.

11. The RF ranging receiver of claim 10, further comprising a timing processing unit, which is configured to generate and provide the control signals determining the linear combination of antenna signals or the selection of the antenna signals to be used for determining candidate arrival times of the ranging signal.

12. An RF ranging transceiver, comprising a ranging transmitter, which is configured to generate and transmit a RF ranging signal to an external RF ranging receiver, and a RF ranging receiver according to claim 9.

13. The RF ranging transceiver of claim 12, wherein the ranging transmitter is configured to transmit the ranging signal via an antenna array that is switched to form an array setup, which has been determined by the internal ranging receiver as allowing a detection of the earliest candidate arrival time in communication with the given external RF ranging receiver.

14. An RF ranging system, comprising at least one first ranging node for generating and transmitting a RF ranging signal, and at least one second ranging node, which either forms or comprises a RF ranging receiver according to claim 9, wherein the first or the second ranging node is configured to determine a distance between the first and second ranging nodes using the time of arrival of the ranging signal determined by the second ranging node.

15. An RF locating system, comprising at least one first ranging node for generating and transmitting a RF ranging signal, and at least two second ranging nodes, which either form or comprise a RF ranging receiver according to claim 9, wherein the first or at least one of the second ranging nodes is configured to determine a position of the at least one of the second ranging nodes using the time of arrival of the ranging signal determined by the second ranging nodes.

16. A computer program product, including a non-transitory computer-readable medium, comprising software code for performing the steps of the method of claim 1 when loaded into an internal memory of a digital computer and executed on the computer.

\* \* \* \* \*